United States Patent
Kim et al.

(10) Patent No.: US 11,637,306 B2
(45) Date of Patent: Apr. 25, 2023

(54) MEMBRANE-ELECTRODE ASSEMBLY, METHOD FOR MANUFACTURING SAME, AND FUEL CELL COMPRISING SAME

(71) Applicant: KOLON INDUSTRIES, INC., Seoul (KR)

(72) Inventors: Jun-Young Kim, Seoul (KR); Kah-Young Song, Seoul (KR); Nak-Won Kong, Seoul (KR); Jin-Hwa Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 197 days.

(21) Appl. No.: 16/626,049

(22) PCT Filed: Jun. 29, 2018

(86) PCT No.: PCT/KR2018/007380
§ 371 (c)(1),
(2) Date: Dec. 23, 2019

(87) PCT Pub. No.: WO2019/004763
PCT Pub. Date: Jan. 3, 2019

(65) Prior Publication Data
US 2021/0143461 A1    May 13, 2021

(30) Foreign Application Priority Data
Jun. 29, 2017   (KR) .................. 10-2017-0082832
Jun. 28, 2018   (KR) .................. 10-2018-0074658

(51) Int. Cl.
*H01M 8/10*       (2016.01)
*H01M 8/1004*   (2016.01)
(Continued)

(52) U.S. Cl.
CPC ....... *H01M 8/1004* (2013.01); *H01M 4/8657* (2013.01); *H01M 4/8663* (2013.01);
(Continued)

(58) Field of Classification Search
CPC ............. H01M 8/1004; H01M 8/1048; H01M 8/1053; H01M 8/1086; H01M 4/8657;
(Continued)

(56) References Cited

U.S. PATENT DOCUMENTS 8,828,619 B2     9/2014 Lee et al.
2014/0193741 A1  7/2014 Sung et al.
(Continued)

FOREIGN PATENT DOCUMENTS

EP   2908373 A1    8/2015
EP   3079194 A1   10/2016
(Continued)

OTHER PUBLICATIONS

International Search Report for PCT/KR2018/007380 dated Oct. 24, 2018 (PCT/ISA/210).
EP search report dated May 4, 2021.
Office action issued by Japan Patent Office.
CN Office action dated May 7, 2022.

*Primary Examiner* — Raymond Alejandro
(74) *Attorney, Agent, or Firm* — Harvest IP Law LLP

(57) ABSTRACT

A membrane-electrode assembly, a method for manufacturing the membrane-electrode assembly, and a fuel cell including the membrane-electrode assembly are disclosed. The membrane-electrode assembly includes: an ion exchange membrane; catalyst layers disposed on both sides of the ion exchange membrane respectively; and a functional modification layer disposed between the ion exchange membrane and each of the catalyst layers. The membrane-electrode assembly has a low hydrogen permeability without a reduction of hydrogen ion conductivity, has excellent interfacial bonding properties between the catalyst layers and the ion (Continued)

exchange membrane, and has excellent performance and durability under high temperature/low humidity conditions.

12 Claims, 2 Drawing Sheets

(51) Int. Cl.
    *H01M 4/86*     (2006.01)
    *H01M 4/88*     (2006.01)
    *H01M 8/1048*     (2016.01)
    *H01M 8/1053*     (2016.01)
    *H01M 8/1086*     (2016.01)

(52) U.S. Cl.
    CPC ......... *H01M 4/881* (2013.01); *H01M 4/8817* (2013.01); *H01M 8/1048* (2013.01); *H01M 8/1053* (2013.01); *H01M 8/1086* (2013.01); *H01M 2008/1095* (2013.01)

(58) Field of Classification Search
    CPC .. H01M 4/8663; H01M 4/881; H01M 4/8817; H01M 2008/1095
    See application file for complete search history.

(56) References Cited

U.S. PATENT DOCUMENTS

| | | | |
|---|---|---|---|
| 2015/0236367 A1* | 8/2015 | Kim | ............... H01M 8/1039 429/482 |
| 2016/0067654 A1 | 3/2016 | Zhang | |
| 2016/0301092 A1 | 10/2016 | Kim et al. | |

FOREIGN PATENT DOCUMENTS

| | | | | |
|---|---|---|---|---|
| JP | 2008159426 | A | 7/2008 | |
| JP | 2011252723 | A | 12/2011 | |
| JP | 2013225433 | A | 10/2013 | |
| JP | 2014099415 | A | 5/2014 | |
| JP | 2017021909 | A | 1/2017 | |
| JP | 2007128682 | A | 5/2017 | |
| KR | 20010092913 | A | 10/2001 | |
| KR | 20070014679 | A | 2/2007 | |
| KR | 10-2009-0017838 | A | 2/2009 | |
| KR | 2009-0054875 | A | 6/2009 | |
| KR | 10-2012-0139549 | A | 12/2012 | |
| KR | 10-1312971 | B1 | 10/2013 | |
| KR | 10-2015-0097024 | A | 8/2015 | |
| KR | 10-2016-0120078 | A | 10/2016 | |
| WO | WO 2009/066952 | * | 2/2009 | ........... C07C 317/14 |

\* cited by examiner

MEMBRANE-ELECTRODE ASSEMBLY, METHOD FOR MANUFACTURING SAME, AND FUEL CELL COMPRISING SAME

CROSS REFERENCE TO RELATED APPLICATIONS

This application is a National Stage of International Application No. PCT/KR2018/007380 filed Jun. 29, 2019, claiming priority based on Korean Patent Application No. 10-2017-0082832, filed Jun. 29, 2017.

TECHNICAL FIELD

The present disclosure relates to a membrane-electrode assembly, a method of manufacturing the same, and a fuel cell including the same, and more particularly to a membrane-electrode assembly exhibiting low hydrogen permeability without reduction in proton conductivity, excellent interfacial bondability between a catalyst layer and an ion exchange membrane, and excellent performance and durability under high-temperature/low-humidity conditions, a method of manufacturing the same, and a fuel cell including the same.

BACKGROUND ART

A fuel cell, which is a cell including a power generation system for directly converting chemical reaction energy into electrical energy through an oxidation/reduction reaction of hydrogen and oxygen contained in a hydrocarbon-based fuel material, such as methanol, ethanol, or natural gas, has attracted attention as a next-generation clean energy source that is capable of replacing fossil energy due to the environmentally friendly characteristics thereof, such as high energy efficiency and reduced discharge of contaminants.

Such a fuel cell has an advantage in that unit cells are stacked to constitute a stack, whereby it is possible to provide various levels of power. In addition, the fuel cell has energy density 4 to 10 times that of a small-sized lithium battery, whereby the fuel cell has attracted attention as a small-sized mobile power source.

The stack of the fuel cell, which substantially generates electricity, has a structure in which several to several tens of unit cells, each of which includes a membrane-electrode assembly (MEA) and a separator (also referred to as a bipolar plate), are stacked, and the membrane-electrode assembly is generally configured to have a structure in which an oxidation electrode (an anode or a fuel electrode) and a reduction electrode (a cathode or an air electrode) are formed at opposite sides of an electrolyte membrane in the state in which the electrolyte membrane is disposed therebetween.

The fuel cell may be classified as an alkaline electrolyte membrane fuel cell or a polymer electrolyte membrane fuel cell (PEMFC) depending on the state and kind of an electrolyte. The polymer electrolyte membrane fuel cell has attracted attention as a mobile power source, a power source for vehicles, and a power source for home use due to a low operating temperature lower than 100° C., rapid starting and response characteristics, and excellent durability thereof.

Representative examples of the polymer electrolyte membrane fuel cell may include a proton exchange membrane fuel cell (PEMFC), which uses hydrogen gas as fuel, and a direct methanol fuel cell (DMFC), which uses liquid methanol as fuel.

The reaction that occurs in the polymer electrolyte membrane fuel cell will be described in brief. First, when fuel such as hydrogen gas is supplied to the oxidation electrode, protons (Hi) and electrons (el are generated at the oxidation electrode as the result of the oxidation reaction of hydrogen. The generated protons are transferred to the reduction electrode via the polymer electrolyte membrane, and the generated electrons are transferred to the reduction electrode via an external circuit. Oxygen is supplied from the reduction electrode, and oxygen is bonded with the protons and the electrons, whereby water is generated through the reduction reaction of oxygen.

Meanwhile, there are many technical problems to be solved in order to realize commercial use of the polymer electrolyte membrane fuel cell, and, in particular, it is necessary to realize high performance, a long lifespan, and a reduction in the price of the polymer electrolyte membrane fuel cell. The element that exerts the greatest influence thereon is the membrane-electrode assembly, and, in particular, the polymer electrolyte membrane is one of the core factors that exert the greatest influence on the performance and price of the MEA.

The requirements of the polymer electrolyte membrane necessary to operate the polymer electrolyte membrane fuel cell include high proton conductivity, high chemical stability, low fuel permeability, high mechanical strength, low moisture content, and excellent dimensional stability. A conventional polymer electrolyte membrane tends not to normally realize high performance under specific temperature and relative-humidity environments, particularly under high-temperature/low-humidity conditions. As a result, a polymer electrolyte membrane fuel cell having the conventional polymer electrolyte membrane applied thereto is limited in the range within which the fuel cell is capable of being applied.

A fluorine-based polymer electrolyte membrane, such as Nafion, which is known as currently exhibiting the best performance, has disadvantages in terms of complexity in manufacturing processes, difficulty in manufacturing technology, and high price thereof. A hydrocarbon-based polymer electrolyte membrane, which has been developed as an alternative thereto, has problems of low proton conductivity under high-temperature/low-humidity conditions, nonuniform interfacial characteristics, and relatively low durability. As a result, there are still many technical barriers to be overcome.

Therefore, research and development of a polymer electrolyte membrane, which is one of the core components of a membrane-electrode assembly that has a great influence on commercialization of a polymer electrolyte membrane fuel cell, is required. Specifically, it is necessary to develop a membrane-electrode assembly to which a hydrocarbon-based polymer electrolyte membrane capable of improving output density and durability under high-temperature/low-humidity conditions is applied.

DISCLOSURE

Technical Problem

It is an object of the present disclosure to provide a membrane-electrode assembly exhibiting low hydrogen permeability without reduction in proton conductivity, excellent interfacial bondability between a catalyst layer and an ion exchange membrane, and excellent performance and durability under high-temperature/low-humidity conditions.

It is another object of the present disclosure to provide a method of manufacturing the membrane-electrode assembly.

It is a further object of the present disclosure to provide a fuel cell including the membrane-electrode assembly.

Technical Solution

In accordance with an aspect of the present disclosure, there is provided a membrane-electrode assembly including an ion exchange membrane, catalyst layers located at opposite surfaces of the ion exchange membrane, and a functional modification layer located between the ion exchange membrane and each of the catalyst layers, wherein the functional modification layer includes an ionomer and nanoparticles substituted with an ion exchange group.

The functional modification layer may include an ionomer having an equivalent weight (EW) of 800 g/eq or less.

The ionomer of the functional modification layer may be a fluorine-based ionomer or a mixture of a fluorine-based ionomer and a hydrocarbon-based ionomer.

The nanoparticles may be substituted with any one cation exchange group selected from the group consisting of a sulfonic acid group, a carboxyl group, a boronic acid group, a phosphate group, an imide group, a phosphonic acid group, a sulfonimide group, a sulfonamide group, and a combination thereof.

The nanoparticles may be any one selected from the group consisting of an ionic conductor, a radical scavenger, an oxygen evolution reaction (OER) catalyst, a gas barrier particle, and a mixture thereof.

The ionic conductor may be any one hydrophilic inorganic additive selected from the group consisting of $SnO_2$, silica, alumina, zirconia, mica, zeolite, phosphotungstic acid, silicon tungstic acid, zirconium hydrogen phosphate, and a mixture thereof.

The radical scavenger may be any one selected from the group consisting of cerium, tungsten, ruthenium, palladium, silver, rhodium, cesium, zirconium, yttrium, manganese, molybdenum, lead, vanadium, titanium, an ion form thereof, an oxide form thereof, a salt form thereof, and a mixture thereof.

The oxygen evolution reaction catalyst may be any one selected from the group consisting of platinum, gold, palladium, rhodium, iridium, ruthenium, osmium, Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and a mixture thereof.

The gas barrier particle may be any one selected from the group consisting of clay, montmorillonite, saponite, laponite, mica, fluorohectorite, kaolinite, vermiculite, and a mixture thereof.

The nanoparticles may have a particle diameter of 1 nm to 100 nm.

The functional modification layer may include 0.1 wt % to 30 wt % of the nanoparticles based on the total weight of the functional modification layer.

The functional modification layer may have a thickness of 10 nm to 3 μm.

The loading amount of the functional modification layer may be 0.01 mg/cm$^2$ to 2.0 mg/cm$^2$.

The ion exchange member may include a hydrocarbon-based ionic conductor.

The ion exchange member may have an ion exchange capacity (IEC) of 1.8 to 3.5 meq/g and a thickness of 10 μm to 25 μm.

The surface of the ion exchange member may be plasma-treated such that the surface of the ion exchange member is activated.

In accordance with another aspect of the present disclosure, there is provided a method of manufacturing a membrane-electrode assembly, the method including plasma-treating the surface of an ion exchange membrane in order to activate the surface of the ion exchange membrane, forming a functional modification layer on the activated surface of the ion exchange membrane, and forming a catalyst layer on the functional modification layer, wherein the functional modification layer includes an ionomer and nanoparticles substituted with an ion exchange group.

The plasma treatment may be performed using any one reaction gas selected from the group consisting of oxygen, argon, helium, ammonia, methane, nitrogen, tetrafluoromethane, a fluorine-based monomer, an acrylic-based monomer, and a combination thereof.

The plasma treatment may be performed under conditions of a pressure of 0.01 mTorr to 1,000 mTorr and a flow rate of the reaction gas of 10 sccm to 1,000 sccm.

The forming a functional modification layer may include substituting surfaces of nanoparticles with an ion exchange group, mixing the nanoparticles substituted with the ion exchange group with the ionomer in order to manufacture a composition for forming a functional modification layer, and applying the composition for forming a functional modification layer to the activated surface of the ion exchange membrane and drying the composition for forming a functional modification layer.

In accordance with a further aspect of the present disclosure, there is provided a fuel cell including the membrane-electrode assembly.

Advantageous Effects

The membrane-electrode assembly according to the present disclosure exhibits low hydrogen permeability without reduction in proton conductivity, excellent interfacial bondability between the catalyst layer and the ion exchange membrane, and excellent performance and durability under high-temperature/low-humidity conditions.

BEST MODE

Hereinafter, embodiments of the present disclosure will be described in detail. However, the embodiments of the present disclosure are provided merely for illustration, and the present disclosure is not limited thereto. The present disclosure is defined only by the category of the appended claims.

Unless particularly mentioned in this specification, it will be understood that, when an element such as a layer, film, region, or substrate is referred to as being "on" another element, it may be "directly on" the other element or an intervening element may also be present.

A membrane-electrode assembly according to an embodiment of the present disclosure includes an ion exchange membrane, catalyst layers located at opposite surfaces of the ion exchange membrane, and a functional modification layer located between the ion exchange membrane and each of the catalyst layers.

Figure 1:
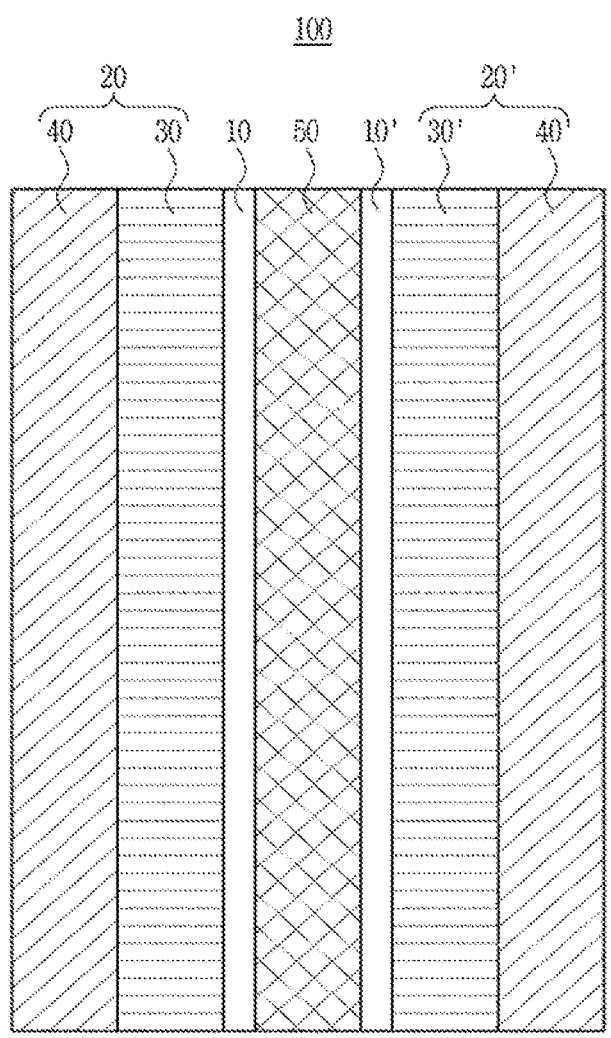
FIG. 1 is a sectional view schematically showing a membrane-electrode assembly according to an embodiment of the present disclosure.

FIG. 1 is a sectional view schematically showing the membrane-electrode assembly.

Referring to FIG. 1, the membrane-electrode assembly 100 includes the ion exchange membrane 50, electrodes 20 and 20' disposed at opposite surfaces of the ion exchange membrane 50, and functional modification layers 10 and 10' located between the ion exchange membrane 50 and the catalyst layers 20 and 20'. The electrodes 20 and 20' respectively include electrode substrates 40 and 40' and catalyst layers 30 and 30' formed at surfaces of the electrode substrates 40 and 40', and may further include microporous layers (not shown) disposed between the electrode substrates 40 and 40' and the catalyst layers 30 and 30', the microporous layers including conductive microparticles, such as carbon powder or carbon black, for easy material diffusion at the electrode substrates 40 and 40'.

In the membrane-electrode assembly 100, the electrode 20, which is disposed at one surface of the ion exchange membrane 50 to perform an oxidation reaction in which protons and electrons are generated from fuel transferred to the catalyst layer 30 via the electrode substrate 40, is referred to as an anode, and the electrode 20', which is disposed at the other surface of the ion exchange membrane 50 to perform a reduction reaction in which water is generated from protons supplied through the ion exchange membrane 50 and an oxidant transferred to the catalyst layer 30' via the electrode substrate 40', is referred to as a cathode.

The functional modification layers 10 and 10' may enable the membrane-electrode assembly 100 to have low hydrogen permeability without reducing proton conductivity, may improve interfacial bondability between the catalyst layers 30 and 30' and the ion exchange membrane 50, thereby improving durability of the membrane-electrode assembly 100, and may improve performance and durability of the membrane-electrode assembly 100 under high-temperature/low-humidity conditions.

In FIG. 1, the functional modification layers 10 and 10' are shown as being disposed at e opposite surfaces of the ion exchange membrane 50; however, the disclosure is not limited thereto. The functional modification layers 10 and 10' may be located only at one surface of the ion exchange membrane 50.

Each of the functional modification layers 10 and 10' includes an ionomer and nanoparticles substituted with an ion exchange group.

The ionomer included in each of the functional modification layers 10 and 10' may have an equivalent weight (EW) of 800 g/eq or less, specifically 500 g/eq to 800 g/eq. The equivalent weight of the ionomer is the molecular mass of the ionomer per ion exchange group included in the ionomer.

The functional modification layers 10 and 10' may provide positive effects in managing water in the membrane-electrode assembly 100 under low-humidity conditions through adjustment of the equivalent weight of the ionomer. In the case in which the ionomer having the above equivalent weight is used, it is possible to improve performance of the membrane-electrode assembly 100 without reducing proton conductivity. Meanwhile, in the case in which the equivalent weight of the ionomer is less than 500 g/eq, an ionomer elution phenomenon or hydrogen fuel permeability may increase. In the case in which the equivalent weight of the ionomer is greater than 800 g/eq, proton conductivity may be reduced under high-temperature and low-humidity conditions.

The ionomer included in each of the functional modification layers 10 and 10' may be a fluorine-based ionomer. In the case in which the fluorine-based ionomer is used, it is possible to improve interfacial bondability between the catalyst layers 30 and 30' and the ion exchange membrane 50, thereby improving durability of the membrane-electrode assembly 100.

The fluorine-based ionomer may be a fluorine-based polymer having a cation exchange group that is capable of transferring cations, such as protons, or an anion exchange group that is capable of transferring anions, such as hydroxyl ions, carbonate, or bicarbonate, and including fluorine in the main chain thereof, or a partially fluorinated polymer, such as a polystyrene-graft-ethylene tetrafluoroethylene copolymer or a polystyrene-graft-polytetrafluoroethylene copolymer. Concrete examples of the fluorine-based ionomer may be fluorine-based polymers including poly(perfluorosulfonic acid), poly(perfluorocarboxylic acid), a copolymer of tetrafluoroethylene and fluoro vinyl ether including a sulfonic acid group, and defluorinated polyetherketone sulfide, or a mixture thereof. The cation exchange group may be any one selected from the group consisting of a sulfonic acid group, a carboxyl group, a boronic acid group, a phosphate group, an imide group, a sulfonimide group, a sulfonamide group, and a combination thereof. In general, the cation exchange group may be a sulfonic acid group or a carboxyl group. In addition, the fluorine-based ionomer may be used either alone or as a mixture of two or more materials.

The fluorine-based ionomer may include a mixture obtained by appropriately mixing the above-illustrated examples of the fluorine-based ionomer in order to satisfy the above equivalent weight range.

In addition, each of the functional modification layers 10 and 10' may include a mixture of the fluorine-based ionomer and a hydrocarbon-based ionomer. In the case in which each of the functional modification layers 10 and 10' includes a mixture of the fluorine-based ionomer and a hydrocarbon-based ionomer, it is possible to reduce gas permeability without affecting interfacial bondability, thereby preventing a hydrogen crossover phenomenon.

At this time, the ion exchange capacity (IEC) of the hydrocarbon-based ionomer may be 0.8 meq/g to 4.0 meq/g or 1.0 meq/g to 3.5 meq/g. In the case in which the ion exchange capacity of the hydrocarbon-based ionomer is within the above range, it is possible to improve performance of the membrane-electrode assembly without reducing proton conductivity under high-temperature/low-humidity conditions. In the case in which the ion exchange capacity of the hydrocarbon-based ionomer is less than 0.8 meq/g, movement of protons may be reduced under high-temperature/low-humidity conditions. In the case in which the ion exchange capacity of the hydrocarbon-based ionomer is greater than 4.0 meq/g, interfacial and transfer resistance may be increased depending on humidity.

In addition, the weight ratio of the fluorine-based ionomer to the hydrocarbon-based ionomer may be 20:1 to 1:20 or 1:1 to 1:10. In the case in which the weight ratio of the fluorine-based ionomer to the hydrocarbon-based ionomer is within the above range, it is possible to reduce a hydrogen crossover phenomenon and to increase interfacial bondability, thereby improving performance and lifespan of the membrane-electrode assembly. In the case in which the weight ratio of the fluorine-based ionomer to the hydrocarbon-based ionomer is less than 1, it may be difficult to achieve the effect of reducing hydrogen fuel permeability. In the case in which the weight ratio of the fluorine-based ionomer to the hydrocarbon-based ionomer is greater than 20, the blended ionomer may be nonuniformly distributed, and resistance of the electrolyte membrane may greatly increase.

The hydrocarbon-based ionomer is a hydrocarbon-based polymer having a cation exchange group that is capable of transferring cations, such as protons, or an anion exchange group that is capable of transferring anions, such as hydroxyl ions, carbonate, or bicarbonate, and including benzimidazole, polyamide, polyamide imide, polyimide, polyacetal, polyethylene, polypropylene, acrylic resin, polyester, polysulfone, polyether, polyether imide, polyether sulfone, polycarbonate, polystyrene, polyphenylene sulfide, polyether ether ketone, polyether ketone, polyaryl ether sulfone, polyphosphazene, or polyphenyl quinoxaline in the main chain thereof. Concrete examples of the hydrocarbon-based ionomer may include, but are not limited to, hydrocarbon-based polymers including sulfonated polyimide (S-PI), sulfonated polyarylether sulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and a mixture thereof In addition, the hydrocarbon-based ionomer may be used either alone or as a mixture of two or more materials.

The nanoparticles included in each of the functional modification layers 10 and 10' may provide functionality to the functional modification layers 10 and 10' without reducing interfacial bondability or increasing interfacial resistance of the membrane-electrode assembly 100, whereby it is possible to overcome a decrease in durability of the membrane-electrode assembly 100 and to improve performance of the membrane-electrode assembly.

At this time, the nanoparticles may be substituted with an ion exchange group. As the nanoparticles are substituted with the ion exchange group, the nanoparticles may be dispersed finely and uniformly, whereby it is possible to increase the number of movement sites and/or moisturization sites of protons. Consequently, additional proton conductivity is provided, whereby it is possible to further improve ion conductivity of the polymer electrolyte membrane under low-humidity conditions.

Specifically, the nanoparticles may be substituted with any one cation exchange group selected from the group consisting of a sulfonic acid group, a carboxyl group, a boronic acid group, a phosphate group, an imide group, a phosphonic acid group, a sulfonimide group, a sulfonamide group, and a combination thereof. Preferably, the nanoparticles are substituted with a sulfonic acid group or a carboxyl group.

The nanoparticles may be any one selected from the group consisting of an ionic conductor, a radical scavenger, an oxygen evolution reaction (OER) catalyst, a gas barrier particle, and a mixture thereof.

The ionic conductor may exhibit high dispersibility and thus may improve proton conductivity of the membrane-electrode assembly 100. The ionic conductor may be a hydrophilic inorganic additive. Specifically, the ionic conductor may be any one selected from the group consisting of $SnO_2$, silica, alumina, zirconia, mica, zeolite, phosphotungstic acid, silicon tungstic acid, zirconium hydrogen phosphate, and a mixture thereof. The ionic conductor may be a hydrophilic inorganic ion additive, and may prevent a decrease in proton conductivity under high-temperature and low-humidity conditions.

The radical scavenger may be uniformly dispersed in the functional modification layers 10 and 10' in order to stabilize the membrane-electrode assembly 100. The radical scavenger is a transition metal ion that is capable of decomposing hydrogen peroxide into water and oxygen in order to inhibit the generation of hydroxyl radicals. Specifically, the radical scavenger may be cerium, tungsten, ruthenium, palladium, silver, rhodium, cesium, zirconium, yttrium, manganese, molybdenum, lead, vanadium, or titanium. The radical scavenger may be used as a metal alone, or may be used in an ion form thereof, an oxide form thereof, a salt form thereof, or any other form thereof.

More specifically, the radical scavenger may be any one selected from the group of $CeO_2$, $MnO_2$, $CsO_2$, $ZrO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3 \cdot 8H_2O$, $Ce(CHCOO)_3 \cdot H_2O$, $CeCl_3 \cdot 6H_2O$, $Ce(NO_3)_6 \cdot 6H_2O$, $Ce(NH_4)_2(NO_3)_6$, $Ce(NH_4)_4(SO_4)_4 \cdot 4H_2O$, $Ce(CH_3COCHCOCH_3)_3 \cdot 3H_2O$, Fe-porphyrin, Co-porphyrin, and a mixture thereof, and a mixture or a compound constituted by one or more thereof may be used.

The oxygen evolution reaction catalyst may be atomized/uniformly dispersed in the functional modification layers 10 and 10' in order to improve durability of the catalyst layer 30 through an effective water decomposition reaction. The oxygen evolution reaction catalyst may include an active material made of a platinum-based metal or a non-platinum-based metal. The platinum-based metal may be selected from the group consisting of platinum, gold, palladium, rhodium, iridium, ruthenium, osmium, a platinum alloy, an alloy thereof, and a mixture thereof, and may be used either alone or as a mixture of two or more materials. The platinum alloy may be selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, and a combination thereof, and may be used either alone or as a mixture of two or more materials. In addition, the non-platinum-based metal may be selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and a combination thereof, and may be used either alone or as a mixture of two or more materials.

In addition, the oxygen evolution reaction catalyst may be used as a metal (black) alone, or may be used in the state in which a carrier is doped with a catalyst metal. The carrier may include a porous inorganic oxide, such as zirconia, alumina, titania, silica, ceria, ITO, WO, $SnO_2$, or $ZnO_2$, or a combination thereof. In addition, a carbon-based carrier may be any one selected from the group consisting of graphite, carbon fiber, carbon sheet, carbon black, acetylene black, Ketjen black, fullerene, carbon nanotube, carbon nanofiber, carbon nanowire, carbon nanoball, carbon nanohorn, carbon nanocage, carbon nanoring, ordered nano-/ meso-porous carbon, carbon aerogel, mesoporous carbon, graphene, stabilized carbon, activated carbon, and a mixture thereof.

The gas barrier particle may be any one selected from the group consisting of clay, montmorillonite, saponite, laponite, mica, fluorohectorite, kaolinite, vermiculite, and a mixture thereof.

The nanoparticles may have a particle diameter of 1 nm to 100 nm or 2 nm to 35 nm. In the case in which the size of the nanoparticles is within the above range, the nanoparticles may be uniformly dispersed in the functional modification layers 10 and 10', whereby it is possible to realize the membrane-electrode assembly 100 without a great increase in resistance. In the case in which the average particle diameter of the nanoparticles deviates from the above range, the nanoparticles may cohere, or the nanoparticles may be insufficiently dispersed in the composition, whereby phase separation may occur.

Each of the functional modification layers 10 and 10' may include 0.1 wt % to 30 wt % or 0.5 wt % to 15 wt % of the nanoparticles based on the total weight of each of the functional modification layers 10 and 10'. In the case in which the content of the nanoparticles is within the above range, the nanoparticles may be uniformly included in the functional modification layers 10 and 10' without phase separation. In the case in which the content of the nanoparticles is less than 0.1 wt %, it may be difficult to achieve the effect of improving proton conductivity, the effect of inhibiting generation of radicals, and effective water decomposition reaction. In the case in which the content of the nanoparticles is greater than 30 wt %, the dispersibility of the nanoparticles may be decreased, whereby proton conductivity may be decreased, ionic resistance may be increased, charge transfer resistance may be increased, mass transfer resistance may be increased, and water may be nonuniformly decomposed under high-temperature and low-humidity conditions. As a result, it may not be possible to improve output performance and durability of the membrane-electrode assembly.

The thickness of each of the functional modification layers 10 and 10' may be 10 nm to 3 µm or 0.5 µm to 2 µm, and the loading amount of each of the functional modification layers 10 and 10' may be 0.01 mg/cm$^2$ to 2.0 mg/cm$^2$. In the case in which the thickness of each of the functional modification layers 10 and 10' is less than 10 nm or the loading amount of each of the functional modification layers is less than 0.01 mg/cm$^2$, interfacial bondability between the ion exchange membrane 50 and the catalyst layers 30 and 30' may not be improved. In the case in which the thickness of each of the functional modification layers 10 and 10' is greater than pm or the loading amount of each of the functional modification layers is greater than 2.0 mg/cm$^2$, interfacial and transfer resistance components may increase, whereby performance of the membrane-electrode assembly 100 may be reduced.

Meanwhile, the ion exchange membrane 50 includes an ionic conductor. The ionic conductor may be a cationic conductor having a cation exchange group that is capable of transferring cations, such as protons, or an anionic conductor having an anion exchange group that is capable of transferring anions, such as hydroxyl ions, carbonate, or bicarbonate.

The cation exchange group may be any one selected from the group consisting of a sulfonic acid group, a carboxyl group, a boronic acid group, a phosphate group, an imide group, a sulfonimide group, a sulfonamide group, and a combination thereof. In general, the cation exchange group may be a sulfonic acid group or a carboxyl group.

The cationic conductor may be a fluorine-based polymer having the cation exchange group and including fluorine in the main chain thereof, a hydrocarbon-based ionomer, such as benzimidazole, polyamide, polyamide imide, polyimide, polyacetal, polyethylene, polypropylene, acrylic resin, polyester, polysulfone, polyether, polyether imide, polyether sulfone, polycarbonate, polystyrene, polyphenylene sulfide, polyether ether ketone, polyether ketone, polyaryl ether sulfone, polyphosphazene, or polyphenyl quinoxaline, a partially fluorinated polymer, such as a polystyrene-graft-ethylene tetrafluoroethylene copolymer or a polystyrene-graft-polytetrafluoroethylene copolymer, or sulfonyl imide.

More specifically, in the case in which the cationic conductor is a proton conductor, each of the polymers may include a cation exchange group selected from the group consisting of a sulfonic acid group, a carboxyl group, a phosphate group, a phosphonic acid group, and a derivative thereof in the side chain thereof. As a concrete example, the cationic conductor may be, but is not limited to, a fluorine-based polymer including poly(perfluorosulfonic acid), poly (perfluorocarboxylic acid), a copolymer of tetrafluoroethylene and fluoro vinyl ether including a sulfonic acid group, defluorinated polyetherketone sulfide, and a mixture thereof, or a hydrocarbon-based polymer including sulfonated polyimide (S-PI), sulfonated polyarylether sulfone (S-PAES), sulfonated polyetheretherketone (S PEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, or a mixture of thereof.

Meanwhile, a hydrocarbon-based ionic conductor, which has excellent ion conductivity and is advantageous in terms of price, is preferably used as the cationic conductor.

The anionic conductor is a polymer capable of transporting anions, such as hydroxyl ions, carbonate, or bicarbonate. The anionic conductor is commercially available in the form of hydroxide or halide (generally chloride), and the anionic conductor may be used in an industrial water purification, metal separation, or catalyst process.

A polymer doped with metal hydroxide may generally be used as the anionic conductor. Specifically, poly(ether sulfone), polystyrene, a vinyl-based polymer, poly(vinyl chloride), poly(vinylidene fluoride), poly(tetrafluoroethylene), poly(benzimidazole), or poly(ethylene glycol), doped with metal hydroxide, may be used as the anionic conductor.

Meanwhile, the ion exchange membrane 50 may be a reinforcement membrane configured to have a structure in which pores in a fluorine-based porous support, such as e-PTFE, or a porous support, such as a porous nanoweb support manufactured by electrospinning, etc., are filled with the ionic conductor.

The ion exchange capacity (IEC) of the ion exchange membrane 50 may be 0.8 meq/g to 4.0 meq/g or 1.0 meq/g to 3.5 meq/g. In the case in which the ion exchange capacity of the ion exchange membrane 50 is less than 1.0 meq/g, movement of protons may be reduced under low-humidity conditions. In the case in which the ion exchange capacity of the ion exchange membrane 50 is greater than 3.5 meq/g, interfacial transfer resistance may be increased as humidity increases.

In addition, the thickness of the ion exchange membrane 50 may be 3 μm to 25 μm or 5 μm to 20 μm. In the case in which the thickness of the ion exchange membrane 50 is less than 3 μm, hydrogen fuel permeability may be abruptly increased under high-temperature and low-humidity conditions, whereby chemical stability of the polymer electrolyte member may be reduced. In the case in which the thickness of the ion exchange membrane 50 is greater than 25 μm, movement of protons may be reduced under low-humidity conditions, whereby resistance of the polymer electrolyte member may be increased and thus ion conductivity may be reduced.

Any one may be used as catalyst particles in each of the catalyst layers 30 and 30', as long as the catalyst particles can be used as a catalyst in hydrogen oxidation reaction and oxygen reduction reaction. Preferably, a platinum-based metal is used as the catalyst particles.

The platinum-based metal may include one selected from the group consisting of platinum (Pt), palladium (Pd), ruthenium (Ru), iridium (Ir), osmium (Os), a platinum-M alloy (M being at least one selected from the group consisting of palladium (Pd), ruthenium (Ru), iridium (Ir), osmium (Os), gallium (Ga), titanium (Ti), vanadium (V), chrome (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)), a non-platinum alloy, and a combination thereof. More preferably, a combination of two or more metals selected from the platinum-based catalyst metal group is used. However, the present disclosure is not limited thereto. Any platinum-based catalyst metal that is available in the present technical field may be used without limitation.

Specifically, the platinum alloy may be selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, and a combination thereof, which may be used either alone or as a mixture of two or more thereof.

In addition, the non-platinum alloy may be selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and a combination thereof, which may be used either alone or as a mixture of two or more thereof.

The catalyst particles may be used as a metal (black) alone, or may be used in the state in which a carrier is doped with a catalyst metal.

The carrier may be selected from among a carbon-based carrier, porous inorganic oxide, such as zirconia, alumina, titania, silica, or ceria, and zeolite. The carbon-based carrier may be selected from among graphite, super P, carbon fiber, carbon sheet, carbon black, Ketjen black, Denka black, acetylene black, carbon nanotube (CNT), carbon sphere, carbon ribbon, fullerene, activated carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and a combination of one or more thereof. However, the present disclosure is not limited thereto. Any carrier that is available in the present technical field may be used without limitation.

The catalyst particles may be located on the surface of the carrier, or may permeate into the carrier while filling pores in the carrier.

In the case in which a noble metal carrier dopant is used as the catalyst, a commercially available catalyst may be used, or the carrier may be doped with the noble metal in order to manufacture the catalyst. The process of doping the carrier with the noble metal is well-known in the art to which the present disclosure pertains and is easily understood by those skilled in the art even though a detailed description thereof is omitted in this specification.

The catalyst particles may be included so as to account for 20 wt % to 80 wt % of the overall weight of each of the catalyst layers 30 and 30'. If the content of the catalyst particles is less than 20 wt %, catalyst activation may be reduced. If the content of the catalyst particles is greater than 80 wt %, the activation area may be reduced due to cohesion of catalyst particles, whereby catalyst activation may be reduced.

In addition, each of the catalyst layers 30 and 30' may include a binder for improving the force of adhesion of the catalyst layers 30 and 30' and transferring protons. Preferably, an ionomer exhibiting ion conductivity is used as the binder. A description of the ionomer is the same as the above description of the functional modification layers 10 and 10', and therefore a duplicate description thereof will be omitted.

However, the ionomer may be used either alone or in the form of a mixture. In addition, the ion conductor may be optionally used together with a non-conductive compound in order to further increase the force of adhesion with the ion exchange membrane 50. Preferably, the amount of the ionomer that is used is adjusted according to the purpose thereof.

At least one selected from the group consisting of polytetrafluoroethylene (PTFE), a tetrafluoroethylene-hexafluoropropylene copolymer (FEP), a tetrafluoroethylene-perfluoroalkyl vinyl ether copolymer (PFA), ethylene/tetrafluoroethylene (ETFE), an ethylene chlorotrifluoroethylene copolymer (ECTFE), polyvinylidene fluoride, a polyvinylidene fluoride-hexafluoropropylene copolymer (PVdF-HFP), dodecylbenzenesulfonic acid, and sorbitol may be used as the non-conductive compound.

The binder may be included so as to account for 20 wt % to 80 wt % of the overall weight of each of the catalyst layers 30 and 30'. In the case in which the content of the binder is less than 20 wt %, generated ions may not be transferred successfully. In the case in which the content of the binder is greater than 80 wt %, pores are insufficient, whereby it may be difficult to supply hydrogen or oxygen (air), and an active area for reaction may be reduced.

Meanwhile, in order to further improve interfacial bondability between the catalyst layers 30 and 30' and the ion exchange membrane 50, the surface of the ion exchange membrane 50 may be plasma-treated, whereby the surface of the ion exchange membrane may be activated. As the surface of the ion exchange membrane is plasma-treated, the surface of the ion exchange membrane 50 may be cleaned and ablated/etched, whereby surface roughness of the ion exchange membrane may be changed, the surface of the ion exchange membrane may be crosslinked or polymerized, or the surface of the ion exchange membrane may be activated.

In addition, the membrane-electrode assembly 100 may further include electrode substrates 40 and 40' located outside the catalyst layers 30 and 30'.

In order to smoothly supply hydrogen or oxygen, a porous conductive substrate may be used as each of the electrode substrates 40 and 40'. In a representative example, carbon paper, carbon cloth, carbon felt, or metal cloth (a porous film made of fibrous metal cloth or a metal film formed on the surface of cloth made of polymer fiber) may be used. However, the present disclosure is not limited thereto. In addition, preferably, a fluorine-based resin that has undergone water-repellency treatment is used as the electrode substrate 40, since it is possible to prevent reactant diffusion efficiency from being reduced by water generated during operation of the fuel cell.

Polytetrafluoroethylene, polyvinylidene fluoride, polyhexafluoropropylene, polyperfluoroalkyl vinyl ether, polyperfluorosulfonylfluoride alkoxy vinyl ether, fluorinated ethylene propylene, polychlorotrifluoroethylene, or a copolymer thereof may be used as the fluorine-based resin.

In addition, a microporous layer for improving reactant diffusion efficiency at each of the electrode substrates 40 and 40' may be further included. The microporous layer may generally include conductive powder having a small particle diameter, such as carbon powder, carbon black, acetylene black, activated carbon, carbon fiber, fullerene, carbon nanotube, carbon nanowire, carbon nanohorn, or carbon nanoring.

The microporous layer is manufactured by coating a composition, including conductive powder, a binder resin, and a solvent, on each of the electrode substrates 40 and 40'. Polytetrafluoroethylene, polyvinylidene fluoride, polyhexafluoropropylene, polyperfluoroalkyl vinyl ether, polyperfluorosulfonylfluoride, alkoxy vinyl ether, polyvinyl alcohol, cellulose acetate, or a copolymer thereof is preferably used as the binder resin. Ethanol, alcohol, such as isopropyl alcohol, n-propyl alcohol, or butyl alcohol, water, dimethylacetamide, dimethyl sulfoxide, N-methylpyrrolidone, or tetrahydrofuran is preferably used as the solvent. The coating process may be performed using a screen printing method, a spray coating method, or a doctor-blade coating method depending on the viscosity of the composition. However, the present disclosure is not limited thereto.

A method of manufacturing a membrane-electrode assembly according to another embodiment of the present disclosure includes a step of plasma-treating the surface of an ion exchange membrane in order to activate the surface of the ion exchange membrane, a step of forming a functional modification layer on the activated surface of the ion exchange membrane, and a step of forming a catalyst layer on the functional modification layer.

First, the surface of the ion exchange membrane is plasma-treated in order to activate the surface of the ion exchange membrane.

As the surface of the ion exchange membrane is plasma-treated in order to activate the surface of the ion exchange membrane, interfacial bondability between the catalyst layer and the ion exchange membrane may be further improved. Various effects may be obtained depending on materials used when plasma treatment is performed.

Specifically, in order to change surface roughness of the ion exchange membrane by cleaning and ablating/etching the surface of the ion exchange membrane, any one gas selected from the group consisting of oxygen, argon, helium, and a combination thereof may be used.

Also, in order to crosslink the surface of the ion exchange membrane, any one gas selected from the group consisting of argon and helium, which are oxygen-free noble gases, and a combination thereof may be used.

Also, in order to activate the surface of the ion exchange membrane by generating radicals on the surface of the ion exchange membrane, any one gas selected from the group consisting of ammonia, argon, helium, methane, nitrogen, tetrafluoromethane, and a combination thereof may be used.

Also, in order to polymerize the surface of the ion exchange membrane, any one monomer gas selected from the group consisting of a fluorine-based monomer, an acrylic-based monomer, and a combination thereof may be used. Any one selected from the group consisting of perfluorocarbon, hydrofluorocarbon, fluorocarbon, trifluoroethylene, tetrafluoroethylene, perfluoroethylene, perfluoropropylene, vinyl fluoride, vinylidene fluoride, tetrafluoropropylene, hexafluoropropylene, hexafluoroisobutylene, perfluorobutylethylene, and a combination thereof may be used as the fluorine-based monomer, and any one selected from the group consisting of acrylonitrile, acrylic acid, acrylate, derivatives thereof substituted with an alkyl group or an alkoxyalkyl group of $C_1$-$C_{10}$, and a combination thereof may be used as the acrylic-based monomer.

In the above, the combination thereof includes use of a mixture of the above materials and sequential use of the above materials.

The plasma treatment of the ion exchange membrane may be performed by supplying the reaction gas into a plasma reactor and activating the plasma reactor. Pressure in the plasma reactor is 0.01 mTorr to 1,000 mTorr, and the flow rate of the reaction gas is maintained at 10 sccm to 1,000 sccm. In the case in which the flow rate of the reaction gas in the reactor is less than 10 sccm, surface activation may be nonuniform. In the case in which the flow rate of the reaction gas in the reactor is greater than 1,000 sccm, no plasma may be generated due to injection of an excessive amount of the reaction gas.

The plasma treatment may be performed under conditions of a plasma power of 1 W to 500 W and a plasma treatment time of 30 seconds to 30 minutes. In the case in which the plasma power is greater than 500 W, heat may be excessively generated in the apparatus, whereby deformation or surface cracks of the polymer electrolyte membrane may occur and thus performance of the polymer electrolyte membrane may be seriously deteriorated. In addition, the plasma treatment time is set to conditions within which the structure and physical properties of the polymer electrolyte membrane are not changed, and is preferably 30 seconds to 30 minutes. In the case in which the plasma treatment time is less than 30 seconds, uniform activation may not be achieved. In the case in which the plasma treatment time is greater than 30 minutes, deformation or surface cracks of the polymer electrolyte membrane may occur, which is undesirable.

Subsequently, the functional modification layer is formed on the activated surface of the ion exchange membrane.

Specifically, the step of forming a functional modification layer includes a step of substituting the surfaces of nanoparticles with an ion exchange group, a step of mixing the nanoparticles substituted with the ion exchange group with the ionomer in order to manufacture a composition for forming a functional modification layer, and a step of applying the composition for forming a functional modification layer to the activated surface of the ion exchange membrane and drying the composition for forming a functional modification layer.

An example of the method of substituting the nanoparticles with the ion exchange group in the case in which the ion exchange group is a sulfonic acid group, which is a cation exchange group, will be described in detail. The nanoparticles may be sulfonated using a sulfonating agent in order to introduce the ion exchange group into the nanoparticles.

Sulfuric acid may be used as the sulfonating agent. In another example, the manufactured polymer may be reacted in a chlorinated solvent, such as dichloromethane, chloroform, or 1,2-dichloroethane, under the presence of an excessive amount of chlorosulfonic acid in order to manufacture nanoparticles substituted with a proton conduction group.

Subsequently, the nanoparticles substituted with the ion exchange group and the ionomer are mixed with each other in order to manufacture a composition for forming a functional modification layer.

The composition for forming a functional modification layer may include the ionomer in a concentration of 0.1% to 30% or in a concentration of 1% to 10%. In the specification of the present disclosure, the concentration means percent concentration, and the percent concentration may be calculated as percentage of the mass of a solute to the mass of a solution.

In the case in which the composition for forming a functional modification layer includes the ionomer within the above concentration range, it is possible to improve proton conductivity and interfacial bondability without increasing interfacial resistance of the membrane-electrode assembly. In the case in which the concentration of the ionomer is less than 0.1%, proton transfer ability may be reduced. In the case in which the concentration of the ionomer is greater than 30%, the ionomer may be nonuniformly distributed.

Ethanol, alcohol, such as isopropyl alcohol, n-propyl alcohol, or butyl alcohol, water, dimethylacetamide, dimethyl sulfoxide, N-methylpyrrolidone, or tetrahydrofuran is preferably used as the solvent.

The functional modification layer may be formed by applying the composition for forming a functional modification layer to the ion exchange membrane and drying the composition for forming a functional modification layer. The composition for forming a functional modification layer may be applied to the ion exchange membrane using slot-die coating, bar coating, comma coating, screen printing, spray coating, doctor blade coating, brush coating, etc.

The drying process may be performed at 25° C. to 90° C. for 12 hours or more. In the case in which the drying temperature is less than 25° C. and the drying time is less than 12 hours, the functional modification layer may be sufficiently dried. In the case in which drying is performed at a temperature higher than 90° C., the functional modification layer may be cracked.

Finally, the catalyst layer is formed on the functional modification layer.

First, a composition for forming the catalyst layer including a catalyst, an ionomer, and a solvent is manufactured, and then the catalyst layer is formed using the same.

The solvent may be selected from the group consisting of water, a hydrophilic solvent, an organic solvent, and a mixture of one or more thereof.

The hydrophilic solvent may have at least one functional group selected from the group consisting of alcohol, ketone, aldehyde, ester, carboxylic acid, ether, and amide, each of which includes straight-chain or branched-chain saturated or unsaturated hydrocarbon having a carbon number ranging from 1 to 12 as the main chain thereof. Each thereof may include an aliphatic or aromatic cyclic compound as at least a portion of the main chain thereof. As concrete examples, the alcohol may be methanol, ethanol, isopropyl alcohol, ethoxyethanol, n-propyl alcohol, butyl alcohol, 1,2-propanediol, 1-pentanol, 1,5-pentanediol, or 1,9-nonanediol, the ketone may be heptanone or octanone, the aldehyde may be benzaldehyde or tolualdehyde, the ester may be methyl pentanoate or ethyl 2-hydroxy propanoate, the carboxylic acid may be pentanoic acid or heptanoic acid, the ether may be methoxybenzene or dimethoxypropane, and the amide may be propanamide, butylamide, or dimethylacetamide.

The organic solvent may be selected from among N-methylpyrrolidone, dimethyl sulfoxide, tetrahydrofuran, and a mixture of two or more thereof.

The solvent may be included so as to account for 80 to 95 wt % of the total weight of the composition for forming the catalyst layer. If the content of the solvent is less than 80 wt %, the solid content is too high, whereby the catalyst layer 30 may be cracked at the time of coating the catalyst layer, and dispersion may not be sufficiently achieved due to the high viscosity thereof. If the content of the solvent is greater than 95 wt %, activation of the catalyst layer may be adversely affected.

As a concrete example of the step of manufacturing the catalyst layer using the composition for forming the catalyst layer, the composition for forming the catalyst layer may be coated on a release film in order to manufacture the catalyst layer.

When the composition for forming the catalyst layer is coated on the release film, the composition for forming the catalyst layer, in which the catalyst is dispersed, may be continuously or intermittently transported to a coater, which may uniformly coat the composition for forming the catalyst layer on the release film so as to have a dry thickness of 10 μm to 200 μm.

More specifically, the composition for forming the catalyst layer may be continuously transported to a coater, such as a die coater, a gravure coater, a bar coater, or a comma coater, through a pump depending on viscosity of the composition for forming the catalyst layer, may be uniformly applied to a decal film using slot-die coating, bar coating, comma coating, screen printing, spray coating, doctor blade coating, brush coating, etc. such that the catalyst layer 30 has a dry thickness of 10 μm to 200 μm, more preferably 10 μm to 100 μm, and may pass through a drying furnace maintained at a predetermined temperature in order to volatilize the solvent.

In the case in which the composition for forming the catalyst layer is coated so as to have a thickness less 10 μm, content of the catalyst is small, whereby activation may be reduced. In the case in which the composition for forming the catalyst layer is coated so as to have a thickness greater than 200 μm, the movement distance of ions and electrons may be increased, whereby resistance may be increased.

The drying process may be performed at 25° C. to 90° C. for 12 hours or more. In the case in which the drying temperature is less than 25° C. and the drying time is less than 12 hours, the catalyst layer may be sufficiently dried. In the case in which drying is performed at a temperature higher than 90° C., the catalyst layer may be cracked. However, the method of applying and drying the composition for forming the catalyst layer is not limited thereto.

Next, the catalyst layer and the ion exchange membrane are bonded to each other via the functional modification layer. Optionally, the catalyst layer and release film may be cut to a desired size, and may be bonded to the ion exchange membrane having the functional modification layer formed thereon.

The method of bonding the catalyst layer and the ion exchange membrane to each other via the functional modification layer may include a transfer step through thermal pressing.

The step of bonding the catalyst layer and the ion exchange membrane having the functional modification layer formed thereon to each other and transferring the catalyst layer using a transfer apparatus may be performed under conditions of 80° C. to 2000° C. and 5 kgf/cm$^2$ to 200 kgf/cm$^2$. In the case in which the transfer step is performed under conditions of less than 80° C. and less than 5 kgf/cm$^2$, the catalyst layer on the release film may not be appropriately transferred. In the case in which the temperature is greater than 200° C., the polymer of the ion exchange membrane may be denaturalized. In the case in which the transfer step is performed under a condition of greater than 200 kgf/cm$^2$, the porous structure in the catalyst layer may be collapsed, whereby performance of the catalyst layer may be reduced.

A fuel cell according to a further embodiment of the present disclosure may include the membrane-electrode assembly.

Figure 2:
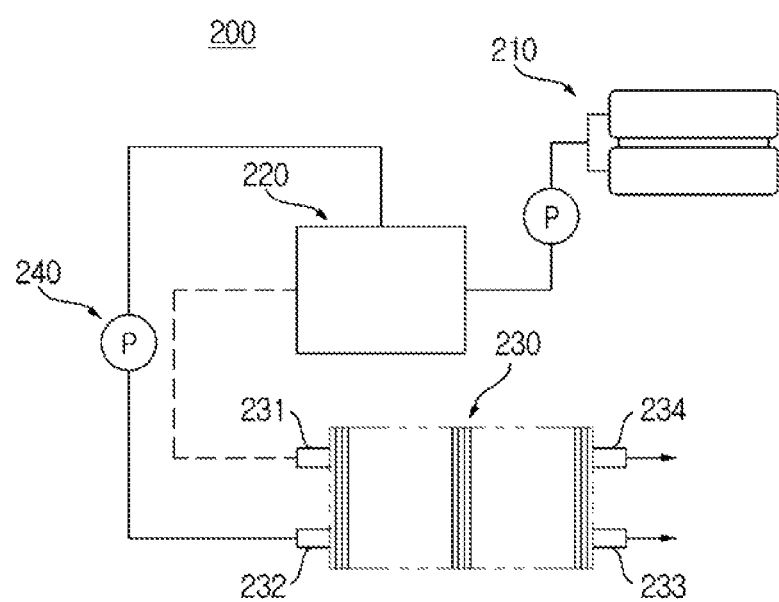
FIG. 2 is a schematic view showing the overall construction of a fuel cell according to an embodiment of the present disclosure.

FIG. 2 is a schematic view showing the overall construction of the fuel cell.

Referring to FIG. 2, the fuel cell 200 includes a fuel supply unit 210 for supplying a mixed fuel including fuel and water mixed with each other, a modification unit 220 for modifying the mixed fuel to generate a modified gas including hydrogen gas, a stack 230 for inducing an electrochemical reaction between the modified gas including the hydrogen gas, supplied from the modification unit 220, and an oxidant to generate electrical energy, and an oxidant supply unit 240 for supplying the oxidant to the modification unit 220 and the stack 230.

The stack 230 includes a plurality of unit cells for inducing oxidation/reduction reaction between the modified gas including the hydrogen gas, supplied from the modification unit 220, and the oxidant, supplied from the oxidant supply unit 240, to generate electrical energy.

Each of the unit cells, which is an independent cell capable of generating electricity, includes the membrane-electrode assembly for inducing an oxidation/reduction reaction between a modified gas including hydrogen gas and oxygen in an oxidant, and a separator (which is also called a bipolar plate; hereinafter referred to as a "separator") for supplying the modified gas including the hydrogen gas and the oxidant to the membrane-electrode assembly. The separators are disposed at opposite sides of each of the membrane-electrode assemblies in the state in which the membrane-electrode assembly is located between the separators. The separators located at the outermost sides of the stack may be particularly referred to as end plates.

One of the end plates is provided with a first supply pipe 231 for injecting a modified gas including hydrogen gas, supplied from the modification unit 220, and a second supply pipe 232 for injecting oxygen gas, and the other end plate is provided with a first discharge pipe 233 for discharging the modified gas including the remaining unreacted hydrogen gas in the unit cells to the outside and a second discharge pipe 234 for discharging the remaining unreacted oxidant in the unit cells to the outside.

MODE FOR INVENTION

Hereinafter, concrete examples of the present disclosure will be set forth. However, the following examples are given merely to concretely illustrate or describe the present disclosure, and the present disclosure is not limited thereto. In addition, content that is not described herein may be sufficiently technically inferred by those skilled in the art to which the present disclosure pertains, and therefore a description thereof will be omitted.

MANUFACTURING EXAMPLE

Manufacture of Membrane-Electrode Assembly

Comparative Example 1

88 wt % of a PtCo/C cathode catalyst was stirred and dispersed in 12 wt % of a Nafion®/H$_2$O/2-propanol solution, as a binder, using an ultrasonic method to manufacture a cathode composition. The manufactured cathode composition was coated on a Teflon release film using a doctor-blade coating method, and was dried at 60° C. for 6 hours to manufacture a cathode. At this time, the loading amount of the catalyst in the cathode was about 0.40 mg/cm$^2$.

88 wt % of a PtRu/C anode catalyst was stirred and dispersed in 12 wt % of a Nafion®/H$_2$O/2-propanol solution, as a binder, using an ultrasonic method to manufacture an anode composition. The manufactured anode composition was coated on a Teflon release film using a doctor-blade coating method, and was dried at 60° C. for 6 hours to manufacture an anode. At this time, the loading amount of the catalyst in the anode was about 0.10 mg/cm$^2$.

A sulfonated polyethersulfone (IEC 2.3 meq/g) ion exchange membrane having a thickness of 15 μm to 20 μm was interposed between the manufactured cathode and the manufactured anode, and the same was pressed under conditions of a temperature of 160° C. and a pressure of 20 kgf/cm$^2$ for three minutes to manufacture a membrane-electrode assembly having the cathode and the anode bound to a polymer electrolyte membrane.

Reference Example 1

The surface of a sulfonated polyethersulfone (IEC 2.3 meq/g) ion exchange membrane having a thickness of 15 μm to 20 μm was cleaned using oxygen gas, and was plasma-treated in a plasma reactor using Ar gas at 300 W for 2 minutes to activate the surface of the ion exchange membrane.

The ion exchange membrane, the surface of which was activated, was interposed between the cathode and the anode manufactured according to Comparative Example 1, and the same was pressed under conditions of a temperature of 160° C. and a pressure of 20 kgf/cm$^2$ for three minutes to manufacture a membrane-electrode assembly having the cathode and the anode bound to a polymer electrolyte membrane.

Reference Example 2

5 wt % of a fluorine-based ionomer, poly(perfluorosulfonic acid) (PFSA), having an EW of 700 g/eq and 95 wt % of an H$_2$O/2-propanol solution were mixed with each other to manufacture a composition for forming a functional modification layer.

The manufactured composition for forming a functional modification layer was coated on a sulfonated polyethersulfone (IEC 2.3 meq/g) ion exchange membrane having a thickness of 15 μm to 20 μm in an amount of 0.11 mg/cm$^2$ using a spray coating method at room temperature to form a functional modification layer having a thickness of about 0.5 μm.

The ion exchange membrane having the functional modification layer formed thereon was interposed between the cathode and the anode manufactured according to Comparative Example 1, and the same was pressed under conditions of a temperature of 160° C. and a pressure of 20 kgf/cm$^2$ for three minutes to manufacture a membrane-electrode assembly having the cathode and the anode bound to a polymer electrolyte membrane.

Reference Example 3

The surface of a sulfonated polyethersulfone (IEC 2.3 meq/g) ion exchange membrane having a thickness of 15 μm to 20 μm was cleaned using oxygen gas, and was plasma-treated in a plasma reactor using Ar gas at 300 W for 2 minutes to activate the surface of the ion exchange membrane.

5 wt % of a fluorine-based ionomer, poly(perfluorosulfonic acid) (PFSA), having an EW of 700 g/eq and 95 wt % of an H$_2$O/2-propanol solution were mixed with each other to manufacture a composition for forming a functional modification layer.

The manufactured composition for forming a functional modification layer was coated on the ion exchange membrane, the surface of which was activated, in an amount of 0.11 mg/cm$^2$ using a spray coating method at room temperature to form a functional modification layer having a thickness of about 0.5 μm.

The ion exchange membrane having the functional modification layer formed thereon was interposed between the cathode and the anode manufactured according to Comparative Example 1, and the same was pressed under conditions of a temperature of 160° C. and a pressure of 20 kgf/cm$^2$ for three minutes to manufacture a membrane-electrode assembly having the cathode and the anode bound to a polymer electrolyte membrane.

Example 1

The surface of a sulfonated polyethersulfone (IEC 2.3 meq/g) ion exchange membrane having a thickness of 15 μm to 20 μm was cleaned using oxygen gas, and was plasma-treated in a plasma reactor using Ar gas at 300 W for 2 minutes to activate the surface of the ion exchange membrane.

5 wt % of a fluorine-based ionomer, poly(perfluorosulfonic acid) (PFSA), having an EW of 700 g/eq, 5 wt % of SiO$_2$ nanoparticles substituted with a sulfonic acid group having an average particle diameter of 7 nm, and 90 wt % of an H$_2$O/2-propanol solution were mixed with one another to manufacture a composition for forming a functional modification layer.

The manufactured composition for forming a functional modification layer was coated on the ion exchange membrane, the surface of which was activated, in an amount of 0.11 mg/cm$^2$ using a spray coating method at room temperature to form a functional modification layer having a thickness of about 0.5 μm.

The ion exchange membrane having the functional modification layer formed thereon was interposed between the cathode and the anode manufactured according to Comparative Example 1, and the same was pressed under conditions of a temperature of 160° C. and a pressure of 20 kgf/cm$^2$ for three minutes to manufacture a membrane-electrode assembly having the cathode and the anode bound to a polymer electrolyte membrane.

Example 2

5 wt % of a fluorine-based ionomer, poly(perfluorosulfonic acid) (PFSA), having an EW of 700 g/eq, 5 wt % of SiO$_2$ nanoparticles substituted with a sulfonic acid group having an average particle diameter of 7 nm, and 90 wt % of an H$_2$O/2-propanol solution were mixed with one another to manufacture a composition for forming a functional modification layer.

The manufactured composition for forming a functional modification layer was coated on a sulfonated polyethersulfone (IEC 2.3 meq/g) ion exchange membrane having a thickness of 15 μm to 20 μm in an amount of 0.11 mg/cm$^2$ using a spray coating method at room temperature to form a functional modification layer having a thickness of about 0.5 μm.

The ion exchange membrane having the functional modification layer formed thereon was interposed between the cathode and the anode manufactured according to Comparative Example 1, and the same was pressed under conditions of a temperature of 160° C. and a pressure of 20 kgf/cm$^2$ for three minutes to manufacture a membrane-electrode assembly having the cathode and the anode bound to a polymer electrolyte membrane.

Reference Example 4

A membrane-electrode assembly was manufactured in the same manner as in Example 1, except that SiO$_2$ nanoparticles were used instead of the SiO$_2$ nanoparticles substituted with the sulfonic acid group in Example 1.

EXPERIMENTAL EXAMPLE

Measurement of Performance of Membrane-Electrode Assembly

Experimental Example 1

Measurement of Performance of Membrane-Electrode Assembly 1

Current density at 0.6 V and voltage at 1.5 A/cm$^2$ of each of the membrane-electrode assemblies manufactured according to Comparative Example and Examples under conditions of 65° C. and 50% relative humidity (RH) were measured, and results are shown in Table 1 below.

TABLE 1

|  | Current density (A/cm$^2$) @ 65° C., 50% RH | Cell voltage (V) @ 65° C., 50% RH |
| --- | --- | --- |
| Comparative Example 1 | 0.90 | 0.475 |
| Reference Example 1 | 0.95 | 0.490 |
| Reference Example 2 | 1.05 | 0.500 |
| Reference Example 3 | 1.15 | 0.535 |

TABLE 1-continued

| | Current density (A/cm$^2$) @ 65° C., 50% RH | Cell voltage (V) @ 65° C., 50% RH |
|---|---|---|
| Reference Example 4 | 1.20 | 0.525 |
| Example 1 | 1.35 | 0.555 |
| Example 2 | 1.25 | 0.540 |

Referring to Table 1 above, it can be seen that the membrane-electrode assemblies manufactured according to Examples exhibit higher performance than the membrane-electrode assembly manufactured according to Comparative Example.

Experimental Example 2

Measurement of Performance of Membrane-Electrode Assembly 2

N$_2$ gas was injected into the anode and the cathode of each of the membrane-electrode assemblies manufactured according to Comparative Example and Examples at an evaluation temperature of 80° C., dry gas was injected into the membrane-electrode assembly for two minutes, and wet gas (150% RH) was injected into the membrane-electrode assembly for two minutes. The dry gas and the wet gas were repeatedly injected, and the above process was performed as one cycle. The above process was repeated in order to evaluate durability of the membrane-electrode assembly. In order to determine whether the ion exchange membrane had been degraded, H$_2$ crossover current density of the membrane-electrode assembly was measured every 2,000 cycles using linear sweep voltammetry (LSV) under conditions of 90° C and 0.2 V.

The wet/dry cycle number at the time when the H$_2$ crossover current density became 2 A/cm$^2$ and the H$_2$ crossover current density at the time of end of life were measured, and results are shown in Table 2 below.

TABLE 2

| | Wet/dry cycle number @ H$_2$ crossover of 2 A/cm$^2$ (cycle) | H$_2$ crossover @ EOL (mA/cm$^2$) |
|---|---|---|
| Comparative Example 1 | 2,000 | 10.8 @ 2,000 cycles |
| Reference Example 1 | 6,000 | 8.1 @ 10,000 cycles |
| Reference Example 2 | 4,000 | 7.6 @ 8,000 cycles |
| Reference Example 3 | 12,000 | 4.8 @ 16,000 cycles |
| Reference Example 4 | 10,000 | 5.5 @ 14,000 cycles |
| Example 1 | 12,000 | 5.1 @ 16,000 cycles |
| Example 2 | 10,000 | 5.2 @ 14,000 cycles |

Referring to Table 2 above, it can be seen that the membrane-electrode assemblies manufactured according to Examples exhibit higher wet/dry cycling durability and lower hydrogen permeability without reduction in proton conductivity than the membrane-electrode assembly manufactured according to Comparative Example.

That is, it can be seen that, in Example 1 and Example 2, as the nanoparticles are substituted with an ion exchange group, the nanoparticles are dispersed finely and uniformly, whereby it is possible to increase the number of movement sites and/or moisturization sites of protons, and therefore additional proton conductivity is provided, whereby it is possible to further improve ion conductivity of the polymer electrolyte membrane under low-humidity conditions.

Also, it can be seen that, in Example 1, interfacial bondability is further improved due to interaction between the nanoparticles substituted with the ion exchange group and the ion exchange membrane, the surface of which was plasma-treated, whereby performance thereof is higher than that of Example 2.

Although the preferred embodiments of the present disclosure have been described above, the scope of the present disclosure is not limited thereto, and various modifications and improvements made by those skilled in the art using the basic concept of the present disclosure defined in the accompanying claims fall within the scope of the present disclosure.

DESCRIPTION OF REFERENCE NUMERALS

100: Membrane-electrode assembly
10, 10': Functional modification layers
20, 20': Electrodes
30, 30': Catalyst layers
40, 40': Electrode substrates
50: Ion exchange membrane
200: Fuel cell
210: Fuel supply unit 220: Modification unit
230: Stack 231: First supply pipe
232: Second supply pipe 233: First discharge pipe
234: Second discharge pipe 240: Oxidant supply unit

INDUSTRIAL APPLICABILITY

The present disclosure relates to a membrane-electrode assembly, a method of manufacturing the same, and a fuel cell including the same, wherein the membrane-electrode assembly exhibits low hydrogen permeability without reduction in proton conductivity, excellent interfacial bondability between a catalyst layer and an ion exchange membrane, and excellent performance and durability under high-temperature/low-humidity conditions.

The invention claimed is:
1. A membrane-electrode assembly comprising:
an ion exchange membrane;
first and second catalyst layers, the ion exchange membrane being disposed between the first and second catalyst layers;
a first functional modification layer between the first catalyst layer and the ion exchange membrane; and
a second functional modification layer between the second catalyst layer and the ion exchange membrane,
wherein each of the first and second functional modification layers comprises an ionomer,
wherein SiO$_2$ nanoparticles substituted with a sulfonic acid group are included in both the first and second functional modification layers but not in the ion exchange membrance interposed between the first and second functional modification layers,
wherein the SiO$_2$ nanoparticles have a particle diameter of 1 nm to 100 nm,
wherein each of the first and second functional modification layers comprises 0.1 wt % to 30 wt % of the SiO$_2$ nanoparticles based on a total weight thereof, and wherein each of the first and second funcational modification layers has a thickness of 10 nm to 3 µm.

2. The membrane-electrode assembly according to claim 1, wherein the ionomer has an equivalent weight (EW) of 800 g/eq or less.

3. The membrane-electrode assembly according to claim 1, wherein the ionomer includes a fluorine-based ionomer or a mixture of a fluorine-based ionomer and a hydrocarbon-based ionomer.

4. The membrane-electrode assembly according to claim 1, wherein a weight per unit area of each of the first and second functional modification layers is 0.01 mg/cm$^2$ to 2.0 mg/cm$^2$.

5. The membrane-electrode assembly according to claim 1, wherein the ion exchange membrane comprises a hydrocarbon-based ionic conductor.

6. The membrane-electrode assembly according to claim 1, wherein the ion exchange membrane has an ion exchange capacity (IEC) of 1.8 to 3.5 meq/g and a thickness of 10 µm to 25 µm.

7. The membrane-electrode assembly according to claim 1, wherein the ion exchange membrane has a surface activated by plasma treatment, which is in contact with either the first functional modification layer or the second functional modification layer.

8. A fuel cell comprising the membrane-electrode assembly according to claim 1.

9. A method of manufacturing a membrane-electrode assembly, the method comprising:
   plasma-treating a surface of an ion exchange membrane in order to activate the surface of the ion exchange membrane;
   forming a functional modification layer on the activated surface of the ion exchange membrane; and
   forming a catalyst layer on the functional modification layer,
   wherein the functional modification layer comprises an ionomer,
   wherein SiO$_2$ nanoparticles substituted with a sulfonic acid group are included in both the functional modification layers but not in the ion exchange membrane,
   wherein the SiO$_2$ nanoparticles have a particle diameter of 1 nm to 100 nm,
   wherein the functional modification layer comprises 0.1 wt % to 30 wt % of the SiO$_2$ nanoparticles based on a total weight thereof, and
   wherein the functional modification layer has a thickness of 10 nm to 3 µm.

10. The method according to claim 9, wherein the plasma treatment is performed using any one reaction gas selected from a group consisting of oxygen, argon, helium, ammonia, methane, nitrogen, tetrafluoromethane, a fluorine-based monomer, an acrylic-based monomer, and a combination thereof.

11. The method according to claim 10, wherein the plasma treatment is performed under conditions of a pressure of 0.01 mTorr to 1,000 mTorr and a flow rate of the reaction gas of 10 sccm to 1,000 sccm.

12. The method according to claim 9, wherein the forming the functional modification layer comprises:
   substituting surfaces of the nanoparticles with the sulfonic acid group by means of a sulfonating agent;
   mixing the nanoparticles substituted with the sulfonic acid group with the ionomer in order to manufacture a composition for forming a functional modification layer; and
   applying the composition for forming a functional modification layer to the activated surface of the ion exchange membrane and drying the composition for forming a functional modification layer.

* * * * *